Jan. 7, 1958  R. D. ALLMAN  2,819,373
VEHICLE HEATING SYSTEM
Filed June 27, 1956
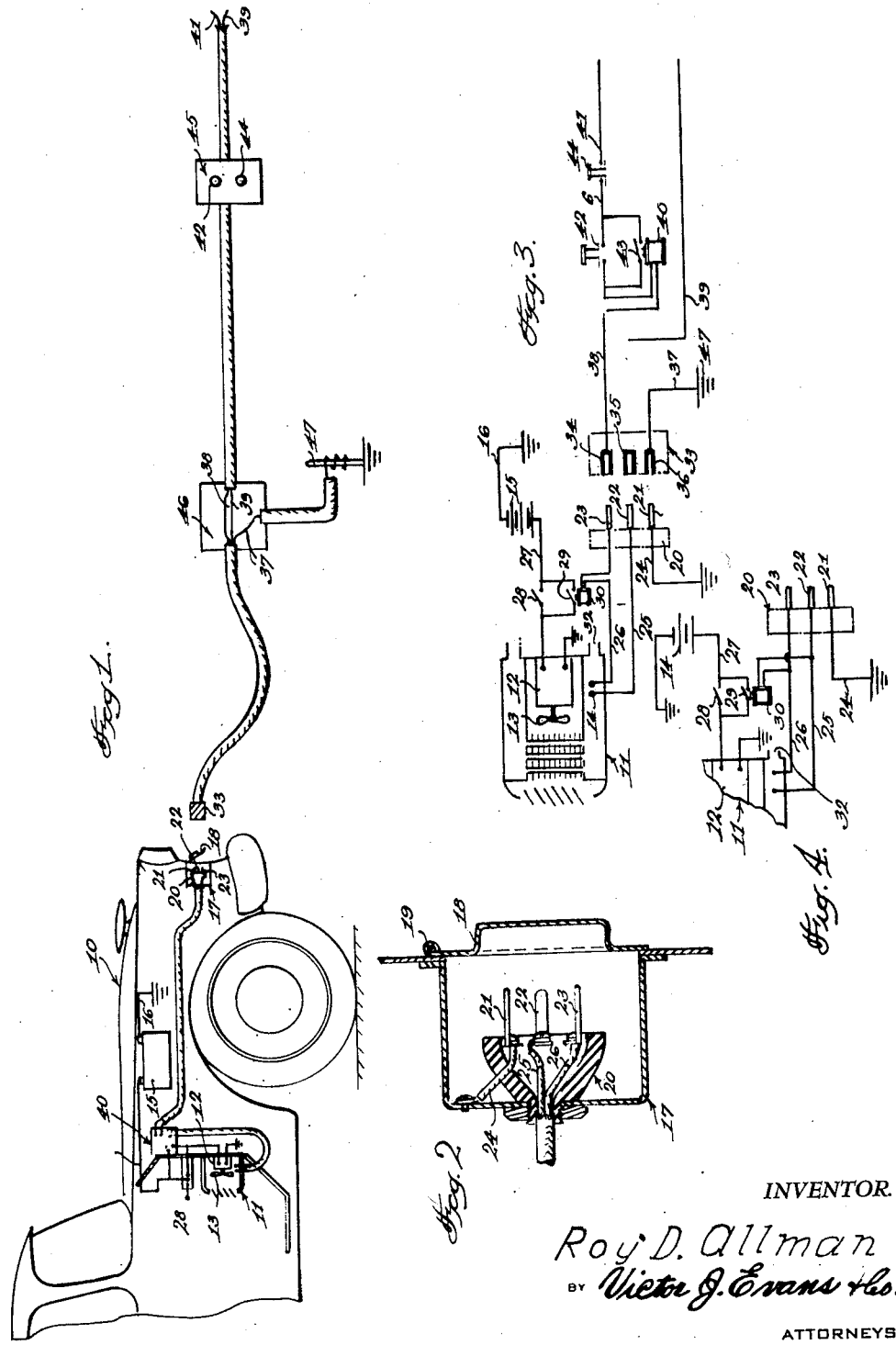
INVENTOR.
Roy D. Allman
BY *Victor J. Evans & Co.*
ATTORNEYS

United States Patent Office 2,819,373
Patented Jan. 7, 1958

2,819,373

VEHICLE HEATING SYSTEM

Roy D. Allman, Asheville, N. C.

Application June 27, 1956, Serial No. 594,229

4 Claims. (Cl. 219—20)

This invention relates to a vehicle, such as an automobile, and more particularly to a heating system for a vehicle.

The object of the invention is to provide a vehicle heating arrangement or system which can be used to turn on the heating element and heater fan motor for a length of time as before the driver of the vehicle enters the vehicle so that the vehicle can be conveniently warmed or heated before it is entered.

Another object of the invention is to provide a vehicle heating electrical hook-up, which includes a means for permitting a person to actuate or energize a heating element and fan motor positioned within the vehicle, whereby the heating element and fan motor can be actuated from a remote location, as for example these elements can be actuated from within a house or home so that the vehicle can be conveniently warmed or preheated as for example for a ten or fifteen minute period before the person enters the vehicle so that when the person does enter the vehicle as during cold weather or the like, the vehicle will be comfortably warm.

A further object of the invention is to provide a vehicle heating electrical hook-up which is extremely simple and inexpensive to manufacture.

Other objects and advantages will be apparent during the following description.

In the accompanying drawings, forming a part of this application, and in which like numerals are used to designate like parts throughout the same:

Figure 1 is a fragmentary side elevational view illustrating a portion of a vehicle and showing various parts of the present invention.

Figure 2 is a fragmentary sectional view taken through the housing mounted on the front of the vehicle.

Figure 3 is a schematic view illustrating the wiring diagram for the present invention.

Figure 4 is a fragmentary schematic wiring diagram illustrating a modification wherein a coil is connected in parallel instead of in series as shown in Figure 3.

Referring in detail to the drawings, the numeral 10 designates a portion of a vehicle such as an automobile, and mounted in the vehicle 10 is a heater 11. The heater 11 is provided with the usual motor 12 for operating the fan or blower 13, and the heater 11 further includes a heating element 14.

The numeral 15 designates a suitable source of electromotive force such as the vehicle battery which is indicated by the numeral 15, and a wire or conductor 16 may serve to ground the battery 15.

Mounted on the vehicle 10 in any suitable location, as for example adjacent the front end thereof, is a hollow housing 17, and a door or cover 18 is hingedly connected to the housing 17 through the medium of a hinge 19. A plug 20 is positioned within the housing 17, and the plug 20 is provided with a plurality of spaced apart terminals 21, 22 and 23, Figure 2. A ground wire 24 leads from the terminal 21 to the housing 17.

A first conductor or wire 25 may lead from the terminal 22, to the heating element 14. A second conductor or wire 26 may lead from the terminal 23 to the heating element 14.

Extending between the battery 15 and the motor 12 is a third conductor 27 which has a first manually operable switch 28 connected in series therewith, Figure 3. A second manually operable switch 29 is connected to the conductor 27, and the switch 29 is arranged in parallel with the first switch 28. An electromagnetic coil 30 is provided for actuating the switch 29, and as shown in Figure 3 the coil 30 is connected in series with the conductor 26. However, as shown in Figure 4 the coil 30 is connected in parallel across the pair of conductors 25 and 26 and either arrangement can be used.

The numerals 31 and 32 may indicate conduits or water hoses which may lead from the heater 11 to the vehicle engine.

The numeral 33 designates a receptacle which is provided with a plurality of sockets 34, 35 and 36, and these sockets are adapted to detachably engage or releasably engage the terminals 21, 22 and 23 of the plug 20. A ground wire 37 may lead from the socket 36 to a suitable ground connection as shown in Figure 3. A fourth conductor 38 may lead from the socket 34, while a fifth conductor 39 may lead from the socket 35 of the receptacle 33. The conductor 38 is connected to an electromagnetic coil 40, and a sixth conductor 41 leads from the coil 40. A push button switch 42 is connected in series in the conductor 41, and a switch member 43 is also connected to the conductor 41, the switch member 43 being arranged in parallel with the push button switch 42. The switch member 43 is adapted to be actuated by the coil 40. An on and off switch 44 is also connected in series with the conductor 41.

From the foregoing, it is apparent that there has been provided a means for permitting a vehicle such as the vehicle 10 to be heated prior to a person entering the vehicle. In use, with the present invention, the receptacle 33 can be arranged in engagement with the plug 20, as for example these two members can be connected together in the evening as when a person parks his car outside the home. Then, electrical energy can be supplied to the heater 11 so as to selectively actuate the heating element 14 and also energize the motor 12 which will drive the fan 13. Thus, the interior of the vehicle 10 can be conveniently heated before the engine is started and before the driver enters the vehicle. Thus, by permitting the heater 11 to operate for a predetermined period of time, as for example for a ten or fifteen minute interval before the driver enters the vehicle, the vehicle will be comfortably warmed so that during cold weather or the like, a person can enter the car and immediately partake of the benefits of a warm vehicle so that it is not necessary to drive the vehicle for ten or fifteen minutes and wait for the heater to warm the car up.

With the present invention, the heater 11 can be easily turned on, and the fan 13 is actuated at the same time that the heating element 14 is energized. In use, after a person parks the automobile or other vehicle, the plug 20 is connected to the receptacle 33. Then, when the operator of the vehicle gets ready to use the vehicle, he presses the button 42 as for example fifteen minutes before starting off in the vehicle. As the button 42 is manually pressed, it actuates the coil 40 which in turn closes the switch 43. The current then flows to the automobile heating element 14 so as to heat the water or liquid in the heater jacket of the heater 11. The magnet or coil 30 is energized and this closes the switch 29 which bypasses the switch 28. The switch 28 is of conventional design and is used to operate the heater by energizing the motor 12 when it is not desired to preheat the vehicle. The switch 28 may be permanently mounted in the vehicle in the usual manner, and by closing the switch 29, the fan motor 12 will be started due to the electric current supplied by the vehicle battery 15.

Thus, it will be seen that the fan motor 12 automatically runs when the hot water element 14 is actuated. Furthermore, when the plug 20 is separated from the receptacle 33, the magnetic coil 40 is deenergized which permits the switch 43 to open so as to turn off the house current to the vehicle. The current can also be turned off from the house by pressing the button 44 which deenergizes the circuit to thereby open the switches 43 and 29. The switch box 45 may be positioned in a convenient location in the house. A junction box 46 may be located at the point where the circuit is grounded to the earth rod or water pipe 47. The numerals 31 and 32 may designate water hoses which lead to the vehicle engine. The wire 24 is a ground wire which increases the safety of the device.

As shown in Figure 4, the coil 30 can be connected across the wires 25 and 26 by a parallel arrangement instead of the series arrangement shown in Figure 3. The various cables and associated parts are of a type which meet the various safety code requirements. The cover 18 may be highly ornamental and attractive and also acts as a weather proof cover for the housing 17. The wires 41 and 39 may lead to a suitable source of electrical energy within the house. The heater 11 is a hot water type of heater. The switch box 45 may contain the coil 40, switch 43, switch 42, and switch 44. A housing or box 48 in the vehicle 10 may hold the magnetic coil 30 and the switch 29.

With the present invention, the fan 13 will be automatically actuated when a person plugs in the water heating element and turns on the current. Also, with the present invention, it is not necessary for the person to go to the vehicle in order to turn on the heater fan since when the person parks the vehicle the night before, he plugs in the plug 20 with the receptacle 33, then, on the next morning, the person really turns on the current from a convenient place in the house about fifteen minutes before starting time, so that it is not necessary to go to the vehicle in order to turn on the heater fan. Furthermore, it is not necessary to go back to the house to turn the current off. Before the vehicle is driven away, the plug 20 is of course detached or disconnected from the receptacle 33. The present invention can be used to warm up a car and defrost the automobile or other vehicle comfortably on cold mornings. The switch 28, which is standard equipment on vehicles, is bypassed by the switch 29, while the hot water element 14 is on.

I claim:

1. In combination, a vehicle body, a source of electrical energy arranged in said body, a hollow housing supported by said body, a plug positioned in said housing and including a plurality of terminals, a fan motor arranged in said body, a heater element arranged contiguous to said fan motor, a first conductor leading from one of said terminals to said heater element, a second conductor leading from another of said terminals to said heating element, a ground wire leading from one of said terminals to said housing, a third conductor leading from said source of electrical energy to said fan motor and said third conductor having a first manually operable switch connected thereto, a second manually operable switch connected to said third conductor and arranged in parallel to said first switch, an electromagnetic coil for actuating said second switch, a receptacle having a plurality of sockets for detachably receiving the terminals of said plug, fourth and fifth conductors leading from said sockets, a second electromagnetic coil connected to said fourth conductor, a sixth conductor leading from said second coil and having a push button switch connected in series therewith, and a switch member actuated by said last named coil and arranged in parallel to said push button switch.

2. The structure as defined in claim 1, wherein said first named coil is connected in parallel across said first and second conductors.

3. The structure as defined in claim 1, wherein said first named coil is connected in series with said second conductor.

4. In combination, a vehicle body, a source of electrical energy arranged in said body, a hollow housing supported by said body, a plug positioned in said housing and including a plurality of terminals, a fan motor arranged in said body, a heater element arranged contiguous to said fan motor, a first conductor leading from one of said terminals to said heater element, a second conductor leading from another of said terminals to said heating element, a ground wire leading from one of said terminals to said housing, a third conductor leading from said source of electrical energy to said fan motor and said third conductor having a first manually operable switch connected thereto, a second manually operable switch connected to said third conductor and arranged in parallel to said first switch, an electromagnetic coil for actuating said second switch, a receptacle having a plurality of sockets for detachably receiving the terminals of said plug, fourth and fifth conductors leading from said sockets, a second electromagnetic coil connected to said fourth conductor, a sixth conductor leading from said second coil and having a push button switch connected in series therewith, and a switch member actuated by said last named coil and arranged in parallel to said push button switch, a door hingedly connected to said housing, and an on and off switch connected to said sixth conductor, and a ground wire connected to one of said sockets.

References Cited in the file of this patent
UNITED STATES PATENTS

| | | |
|---|---|---|
| 1,550,524 | Eremeeff | Aug. 18, 1925 |
| 2,098,194 | Parsons | Nov. 2, 1937 |
| 2,388,855 | Leslie | Nov. 13, 1945 |
| 2,612,830 | Kendrick | Oct. 7, 1952 |